(12) United States Patent
Ben Himane et al.

(10) Patent No.: US 11,170,521 B1
(45) Date of Patent: Nov. 9, 2021

(54) POSITION ESTIMATION BASED ON EYE GAZE

(71) Applicant: Apple Inc., Cupertino, CA (US)

(72) Inventors: Mohamed Selim Ben Himane, Milpitas, CA (US); Anselm Grundhöfer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 16/532,083

(22) Filed: Aug. 5, 2019

Related U.S. Application Data

(60) Provisional application No. 62/737,732, filed on Sep. 27, 2018, provisional application No. 62/820,077, filed on Mar. 18, 2019.

(51) Int. Cl.
| | | |
|---|---|---|
| *G06T 7/70* | (2017.01) | |
| *G06F 3/01* | (2006.01) | |
| *H04N 13/117* | (2018.01) | |
| *G06T 15/20* | (2011.01) | |
| *G06T 19/20* | (2011.01) | |

(52) U.S. Cl.
CPC ............... *G06T 7/70* (2017.01); *G06F 3/013* (2013.01); *G06T 15/20* (2013.01); *G06T 19/20* (2013.01); *H04N 13/117* (2018.05)

(58) Field of Classification Search
CPC . G06T 7/70; G06T 15/20; G06T 19/20; G06F 3/013; H04N 13/117
See application file for complete search history.

(56) References Cited

U.S. PATENT DOCUMENTS

| | | | |
|---|---|---|---|
| 2013/0241805 A1* | 9/2013 | Gomez | G06F 3/013 345/8 |
| 2015/0003819 A1* | 1/2015 | Ackerman | H04N 5/23219 396/51 |
| 2017/0099481 A1* | 4/2017 | Held | G02B 27/017 |
| 2017/0160518 A1* | 6/2017 | Lanman | G06T 19/006 |
| 2018/0357790 A1* | 12/2018 | Kojima | G06K 9/0061 |
| 2019/0073778 A1* | 3/2019 | Lee | G06F 3/013 |

\* cited by examiner

*Primary Examiner* — Chan S Park
*Assistant Examiner* — Daniel C Chang
(74) *Attorney, Agent, or Firm* — Dentons US LLP

(57) ABSTRACT

In an exemplary process for determining a position of an object in a computer-generated reality environment using an eye gaze, a user uses their eyes to interact with user interface objects displayed on an electronic device. A first direction of gaze is determined for a first eye of a user detected via the one or more cameras, and a second direction of gaze is determined for a second eye of the user detected via the one or more cameras. A convergence point of the first and second directions of gaze is determined, and a distance between a position of the user and a position of an object in the computer-generated reality environment is determined based on the convergence point. A task is performed based on the determined distance between the position of the user and the position of the object in the computer-generated reality environment.

27 Claims, 11 Drawing Sheets

POSITION ESTIMATION BASED ON EYE GAZE

CROSS-REFERENCE TO RELATED APPLICATIONS

This application claims the benefit of U.S. Provisional Application No. 62/737,732, filed Sep. 27, 2018, and entitled "Position Estimation Based on Eye Gaze;" and U.S. Provisional Application No. 62/820,077, filed Mar. 18, 2019, and entitled "Position Estimation Based on Eye Gaze," the contents of which are hereby incorporated by reference in their entirety.

TECHNICAL FIELD

The present disclosure relates generally to methods for performing a task in a computer-generated reality environment, and more specifically to determining a depth of an object in a computer-generated reality environment using an eye gaze.

BACKGROUND

Conventional electronic devices use input mechanisms, such as keyboards, buttons, joysticks, and touch-screens, to receive inputs from a user. Some conventional devices also include a screen that displays content responsive to a user's input. Such input mechanisms and displays provide an interface for the user to interact with an electronic device.

SUMMARY

The present disclosure describes techniques for determining a position of an object in a computer-generated reality environment using an eye gaze. According to some embodiments, a user uses his or her eyes to interact with user interface objects displayed in a computer-generated reality environment using an electronic device. The techniques provide a more natural and efficient interface by, in some exemplary embodiments, allowing a user to operate the device and perform various tasks using primarily eye gazes. The techniques can be applied to conventional user interfaces on devices such as desktop computers, laptops, tablets, and smartphones. The techniques are also advantageous for virtual reality and augmented reality devices and applications, as described in greater detail below.

In some embodiments, the techniques include, at an electronic device having one or more cameras: determining a first direction of gaze for a first eye of a user detected via the one or more cameras; determining a second direction of gaze for a second eye of the user detected via the one or more cameras; determining a convergence point of the first direction of gaze and second direction of gaze; determining a distance between a position of the user and a position of an object in an environment based on the convergence point; and performing a task based on the determined distance between the position of the user and the position of the object in the environment.

In some embodiments, a device for performing a task using eye gaze includes one or more cameras, one or more processors, and memory storing one or more programs configured to be executed by the one or more processors. The one or more programs include instructions for: determining a first direction of gaze for a first eye of a user detected via the one or more cameras; determining a second direction of gaze for a second eye of the user detected via the one or more cameras; determining a convergence point of the first direction of gaze and second direction of gaze; determining a distance between a position of the user and a position of an object in an environment based on the convergence point; and performing a task based on the determined distance between the position of the user and the position of the object in the environment.

In some embodiments, a non-transitory (or, optionally, transitory) computer-readable storage medium storing one or more programs configured to be executed by one or more processors performs a task using eye gaze. The one or more programs include instructions for: at an electronic device having one or more cameras, determining a first direction of gaze for a first eye of a user detected via the one or more cameras; determining a second direction of gaze for a second eye of the user detected via the one or more cameras; determining a convergence point of the first direction of gaze and second direction of gaze; determining a distance between a position of the user and a position of an object in an environment based on the convergence point; and performing a task based on the determined distance between the position of the user and the position of the object in the environment.

In some embodiments, the techniques include, at an electronic device: determining a plurality of convergence points of a user's eye gaze in an environment relative to a position of the user, including: determining a first convergence point relative to a first position of the user, and determining a second convergence point relative to a second position of the user; determining, based on the plurality of convergence points, a plurality of locations in the environment, including: determining, based on the first convergence point, a first location in the environment, and determining, based on the second convergence point, a second location in the environment; and performing a task based on the first and second locations.

In some embodiments, a device for performing a task using eye gaze includes one or more processors and memory storing one or more programs configured to be executed by the one or more processors. The one or more programs include instructions for: determining a plurality of convergence points of a user's eye gaze in an environment relative to a position of the user, including: determining a first convergence point relative to a first position of the user, and determining a second convergence point relative to a second position of the user; determining, based on the plurality of convergence points, a plurality of locations in the environment, including: determining, based on the first convergence point, a first location in the environment, and determining, based on the second convergence point, a second location in the environment; and performing a task based on the first and second locations.

In some embodiments, a non-transitory (or, optionally, transitory) computer-readable storage medium storing one or more programs configured to be executed by one or more processors performs a task using eye gaze. The one or more programs include instructions for: at an electronic device: determining a plurality of convergence points of a user's eye gaze in an environment relative to a position of the user, including: determining a first convergence point relative to a first position of the user, and determining a second convergence point relative to a second position of the user; determining, based on the plurality of convergence points, a plurality of locations in the environment, including: determining, based on the first convergence point, a first location in the environment, and determining, based on the second convergence point, a second location in the environment; and performing a task based on the first and second locations.

BRIEF DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
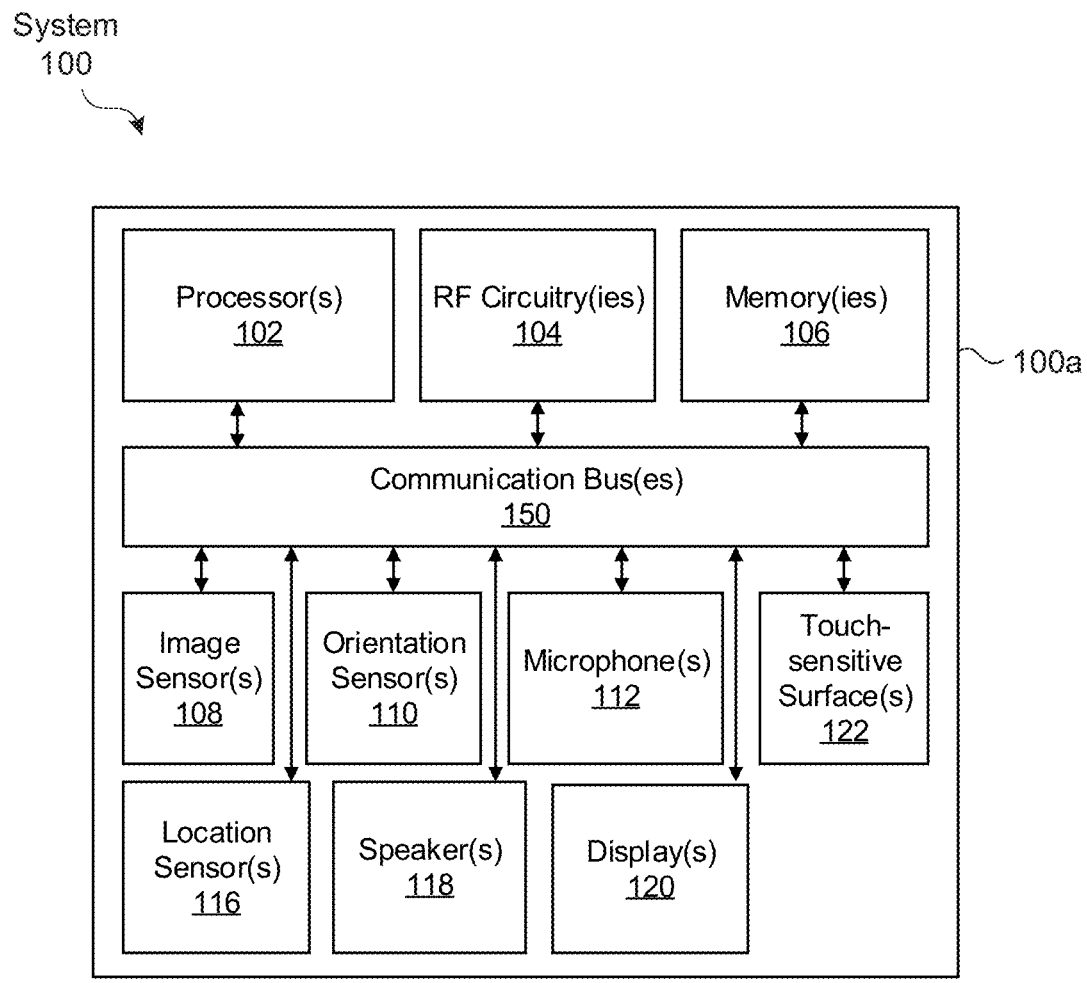
FIGS. 1A-1B depict exemplary systems for use in various computer-generated reality technologies, including virtual reality and mixed reality.

The following description sets forth exemplary methods, parameters, and the like. It should be recognized, however, that such description is not intended to limit the scope of the present disclosure but is instead provided as a description of exemplary embodiments.

Various embodiments of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
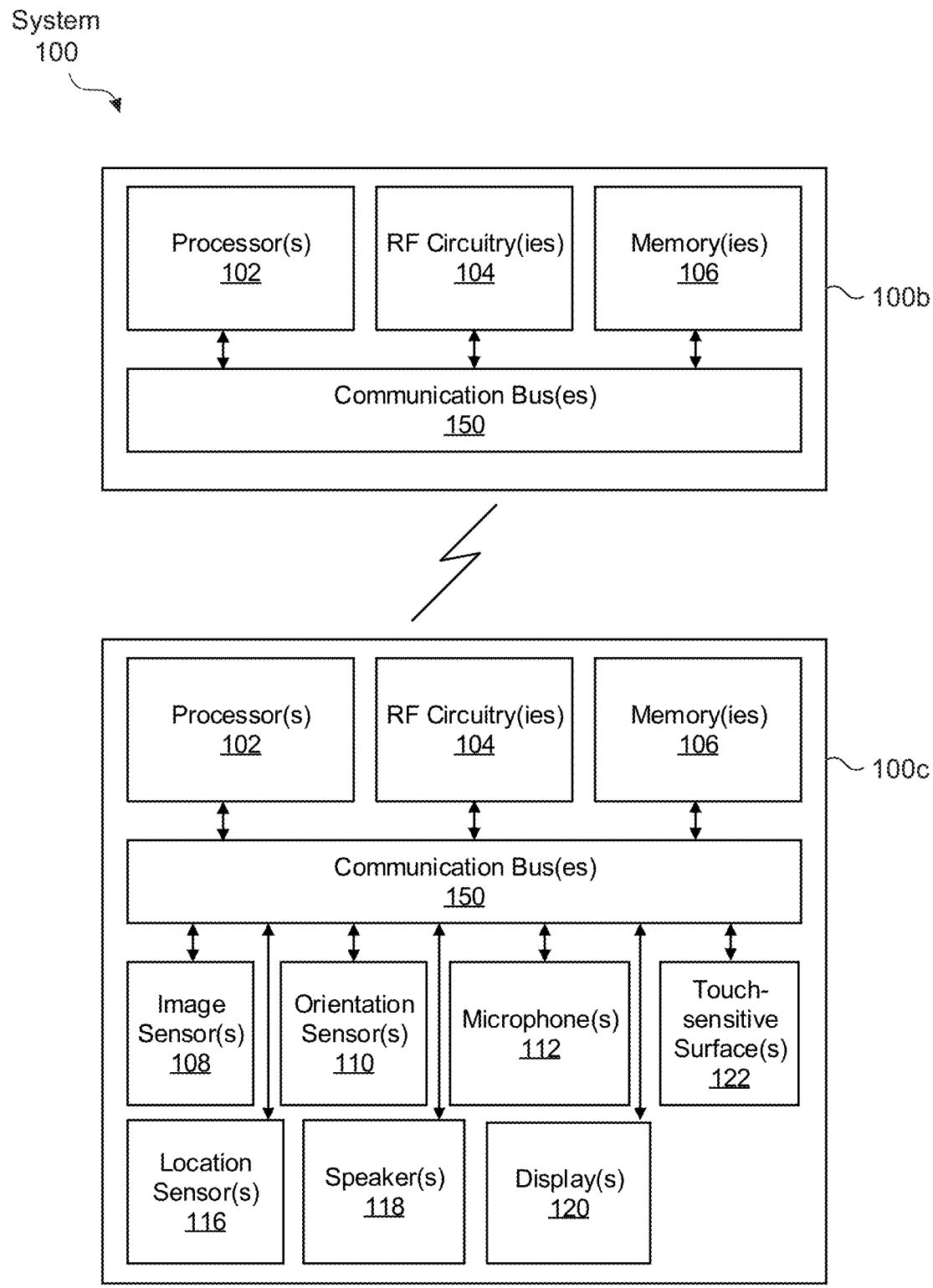

FIG. 1A and FIG. 1B depict exemplary system 100 for use in various computer-generated reality technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/ or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference now to FIGS. 2-6, exemplary techniques are described for determining a position of an object in a computer-generated reality environment using an eye gaze.

Figure 2:
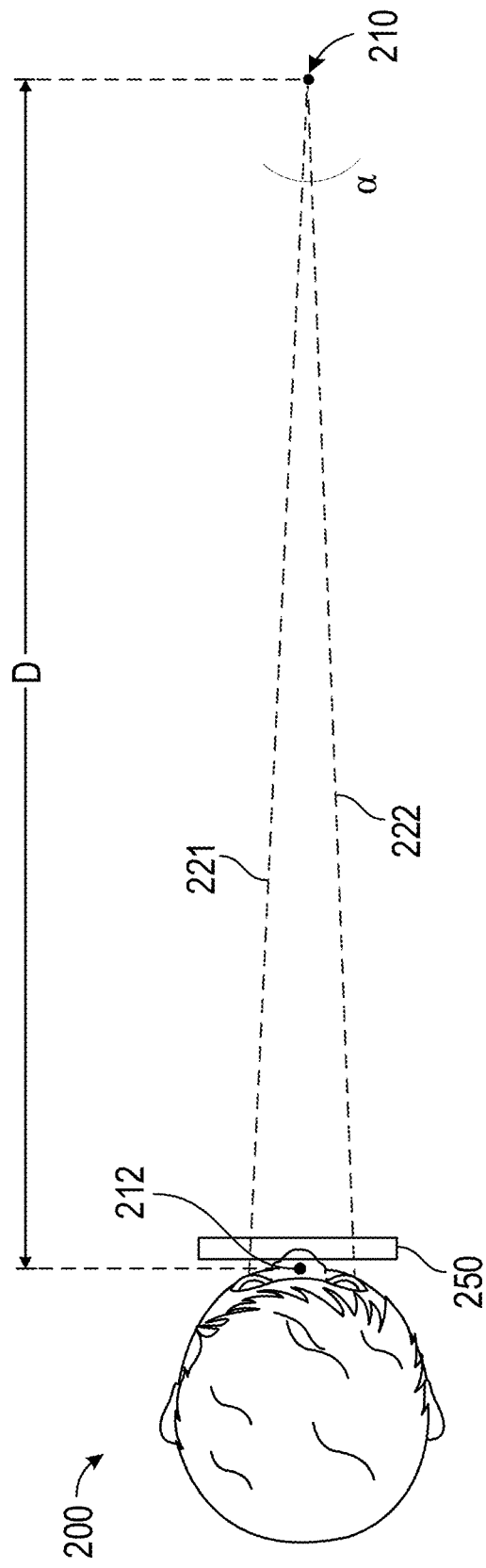
FIG. 2 illustrates a user viewing an object, according to various embodiments.

FIG. 2 illustrates an overhead view of user 200 having a gaze focused at location 210. The user's gaze is defined by vectors 221 and 222, each of which represent a direction in which one of the user's eyes is focused. In some embodiments, location 210 represents a point at which vectors 221 and 222 converge. Unless stated otherwise, for one or more of the embodiments disclosed herein, the term "converge" refers to a manner in which vectors (e.g., eye gaze) approach each other to achieve a threshold distance (e.g., a minimum distance) between the vectors or an intersection of the vectors along at least one plane. For example, in embodiments in which vectors 221 and 222 do not intersect, location 210 can represent a location in which a threshold distance between vectors 221 and 222 is satisfied (e.g., a location in which the distance between the vectors is least). In some embodiments, location 210 can represent a location at which vectors 221 and 222 intersect along at least one plane. For example, vectors 221 and 222 intersect along the overhead view plane illustrated in FIG. 2. These permitted tolerances in the convergence of the vectors facilitate position (e.g., distance, depth, etc.) estimation despite variations in the projected vectors or imperfections in a user's eyes.

As shown in FIG. 2, device 250 (e.g., a HMD device) is positioned in front of user 200 (e.g., in front of the user's eyes) and provides a user interface (shown in FIGS. 4, 5, and 7A-7C) for displaying a computer-generated reality environment in a manner similar to that discussed above with respect to device 100a. In some embodiments, device 250 includes one or more cameras (e.g., image sensor(s) 108, camera 260 in FIG. 4) and is configured to determine a direction of gaze for each of the user's eyes. Example embodiments in which device 250 determines a direction of gaze for the user's eyes are discussed below with reference to FIGS. 3A and 3B. In some embodiments, the camera(s) of device 250 may include one or more of an infrared (IR) camera, an event camera, and RGB camera, any of which may be used to detect the user's eyes, including portions of the eye such as the pupil and reflections on the eye.

Figure 3A:
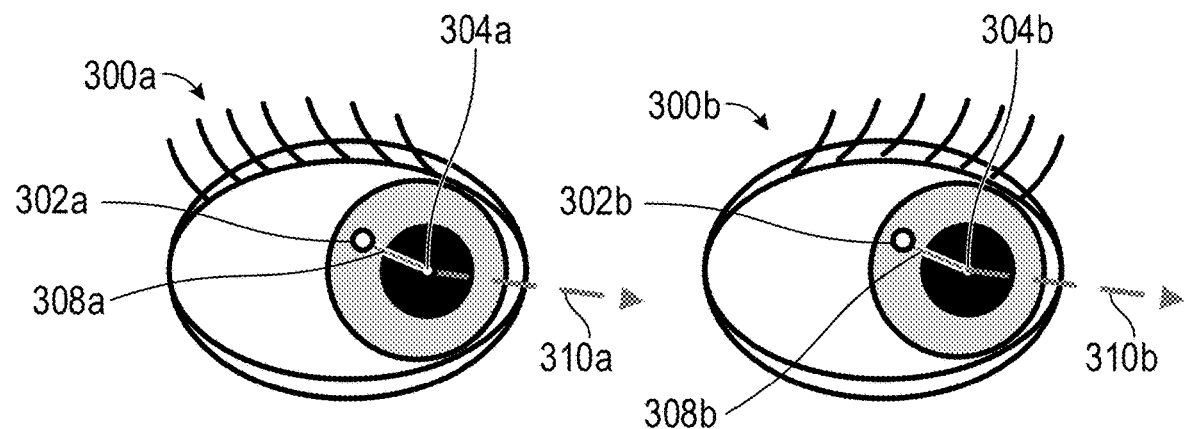
FIGS. 3A-3B illustrate an example process for determining directions of gaze for a user's eyes, according to various embodiments.
Figure 3B:
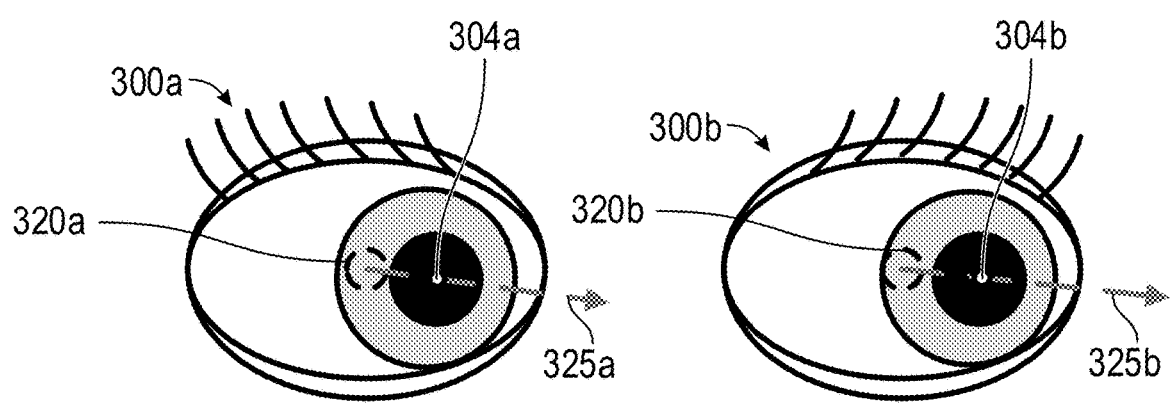

FIGS. 3A and 3B illustrate a view from an approximate perspective of the camera(s) (e.g., 108, 260) of device 250 positioned in front of user's eyes 300a and 300b. FIG. 3A illustrates an embodiment in which device 250 determines a direction of gaze for a user's eye, for instance, using a Pupil Center Corneal Reflection (PCCR) method in which a light source (e.g., a light from device 250) is used to produce one or more reflections on the user's eyeball. Device 250 tracks relative movement between the pupil center point for the eye and the respective location(s) of the reflection(s), and generates glint vectors between respective reflection(s) (e.g., 302a) and a respective pupil center point (304a). Device 250 uses these glint vectors to derive an estimated gaze vector (e.g., 310a) for the respective eye (e.g., 300a) (e.g., using polynomial functions or a generated geometrical model of the eyeball). For example, in FIG. 3A, device 250 analyzes eyeballs 300a and 300b using the device camera(s) and detects physical features of the eyeballs, including pupil center points 304a and 304b (the approximate center of each pupil), as well as reflections 302a and 302b on the user's eyeballs. Device 250 tracks movement of reflection 302a with respect to pupil center point 304a and determines glint vector 308a between reflection 302a and pupil center point 304a. Using the glint vector, device 250 estimates gaze vector 310a, which is shown in FIG. 3A projected from pupil center point 304a. Vector 310a represents the direction of gaze determined by device 250 for eyeball 300a. Similarly, device 250 tracks movement of reflection 302b with respect to pupil center point 304b and determines glint vector 308b between reflection 302b and pupil center point 304b. Using the glint vector, device 250 estimates gaze vector 310b, which is shown in FIG. 3A projected from pupil center point 304b. Vector 310b represents the direction of gaze determined by device 250 for eyeball 300b. In some embodiments, projecting vectors 310a and 310b includes determining (e.g., calculating) a point or region at which the vectors 310a and 310b converge in the computer-generated reality environment (or physical environment). In some embodiments, vector 310a corresponds to vector 222 in FIG. 2. In some embodiments, vector 310b corresponds to vector 221 in FIG. 2.

FIG. 3B illustrates an embodiment in which device 250 determines a direction of gaze for a user's eye by projecting a vector from a determined center point of the eye (e.g., a projected or modeled nucleus of the eye) and through (e.g., intersecting) a center of the eye's pupil. In FIG. 3B, device 250 analyzes eyeballs 300a and 300b using the camera(s) (e.g., 108, 260), and models a center region 320a of eyeball 300a and a center region 320b of eyeball 300b. Using the camera(s), device 250 also detects pupil center points 304a and 304b of the respective eyeballs and projects vectors from the respective center regions 320a/320b through the respective pupil center points 304a/304b of each eye 300a/300b. For example, device 250 projects vector 325a from center region 320a, through pupil center point 304a, to determine the direction of gaze for eyeball 300a. Similarly, device 250 projects vector 325b from center region 320b, through pupil center point 304b, to determine the direction of gaze for eyeball 300b. In some embodiments, projecting vectors 325a and 325b includes determining (e.g., calculating) a point or region at which the vectors 325a and 325b converge in the computer-generated reality environment (or physical environment). In some embodiments, vector 325a corresponds to vector 222 in FIG. 2. In some embodiments, vector 325b corresponds to vector 221 in FIG. 2.

It should be appreciated that the gaze estimation techniques discussed with respect to FIGS. 3A and 3B represent examples for estimating a direction of gaze for the user's eyes. Other methods for estimating the direction of the user's gaze may be used such as, for example, various 2D regression based models, 3D model based methods, cross-ratio based methods, appearance based methods, and shape based methods.

Referring again to FIG. 2, a position of location 210 is represented having distance D, which is the distance between the position of the user (e.g., represented by location 212) and the convergence (e.g., location 210) of vectors 221 and 222 (which correspond to projected vectors 310a/310b and 325a/325b). In some embodiments, the position of the user (e.g., location 212) is determined to be coincident with the midpoint of the user's interpupillary distance, as shown in FIG. 2. In some embodiments, the position of the user is determined to be an approximate location of device 250. In some embodiments, the location of device 250 is determined to be the location of a front-facing camera of device 250 (e.g., a camera or image sensor of device 250 (e.g., image sensor(s) 108) that is used to capture imagery from the physical environment other than that used to detect the user's eye gaze) with respect to a location of the user's eyes.

In conventional systems using a monochromatic camera image, a ray can be determined from a camera center to a point in the image, but the distance to the point is generally unknown. Using the disclosed techniques, however, device 250 determines this distance (e.g., distance D in FIG. 2) by determining a first reference point (e.g., location 212) and a three-dimensional location of the intersection of the user's gaze (e.g., location 210) (e.g., defined in the same coordinate system in which the eyeball center regions and the gaze vectors are defined). Device 250 then calculates the distance between the reference point (e.g., location 212) and the location of the intersection of the user's gaze (e.g., location 210) to determine distance D.

In some embodiments, device 250 determines the three-dimensional location of the intersection of the user's gaze (e.g., location 210) using determined locations of the eyeball center regions (e.g., 320a/320b), the determined gaze of each eye (e.g., vectors 310a/310b/325a/325b), and the determined interpupillary distance for the user. Device 250 then uses one or more of these values to calculate the distance of the intersection of the gaze vectors (e.g., 310a/310b or 325a/325b) and a three-dimensional location (e.g., location 210) of their intersection (e.g., defined in the same coordinate system in which the eyeball center regions and the gaze vectors are defined).

In some embodiments, device 250 determines the convergence point of the user's gaze using a determined convergence region of projected vectors (e.g., vectors 310a/310b or 325a/325b discussed with respect to FIGS. 3A and 3B). In some embodiments, this optionally includes determining an angle at which the vectors converge (e.g., similar to angle α in FIG. 2). In some embodiments, device 250 calculates an interpupillary distance for the user by measuring a distance between the center points 304a and 304b of the user's eyes.

In some embodiments, distance D can be used to calculate (e.g., using a determined value of gaze vectors along x-, y-, and z-axes) a depth of location 210 with respect to the position of the user (e.g., location 212). For example, when vectors 221 and 222 have a value of zero along the y- and z-axes (e.g., the user is looking straight ahead with no vertical or horizontal directional offset to their gaze), distance D is the distance between the user (e.g., location 212) and location 210 as well as the depth of location 210 in the environment relative to the position of the user (e.g., location 212).

In some embodiments, device 250 associates location 210 with a location of an object (e.g., a virtual object or a physical object) in a computer-generated reality environment. In such embodiments, device 250 uses the distance D between user 200 (e.g., location 212) and the point of convergence (e.g., location 210) to determine a position of the object (with respect to the user) in the computer-generated reality environment. Components of the position of the object can include, for example, a distance of the object from the user and/or a depth of the object in the computer-generated reality environment. Examples of such embodiments are illustrated in FIGS. 4, 5, and 7A-7C.

Figure 4:
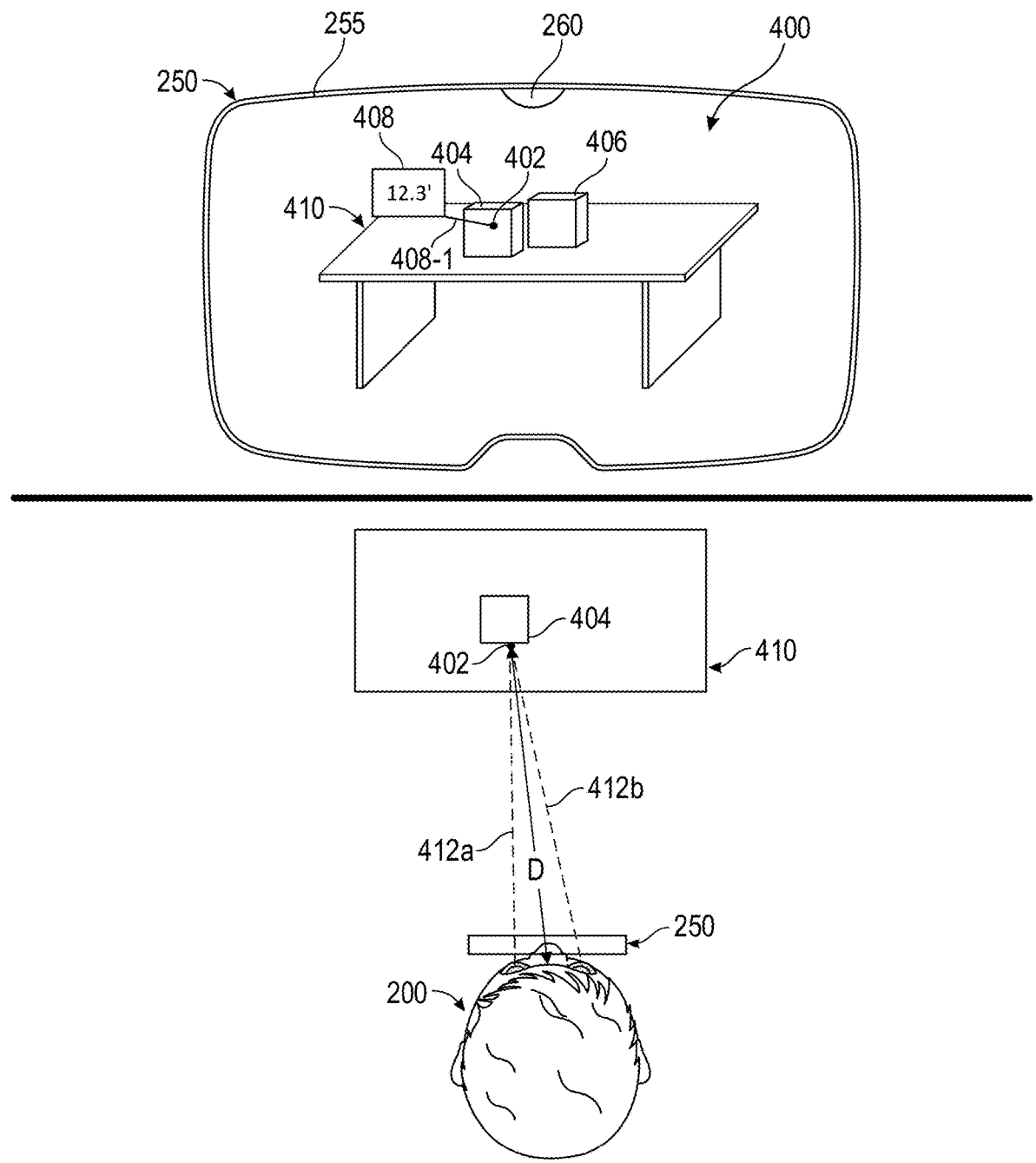
FIG. 4 illustrates an example process for determining a position of an object in an environment using eye gaze, according to various embodiments.
Figure 5:
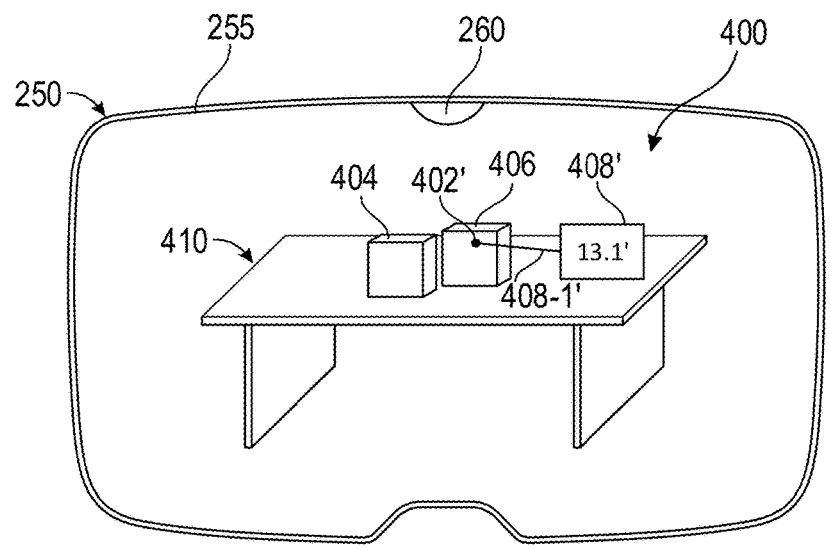
FIG. 5 illustrates an example process for determining a position of an object in an environment using eye gaze, according to various embodiments.
Figure 5:
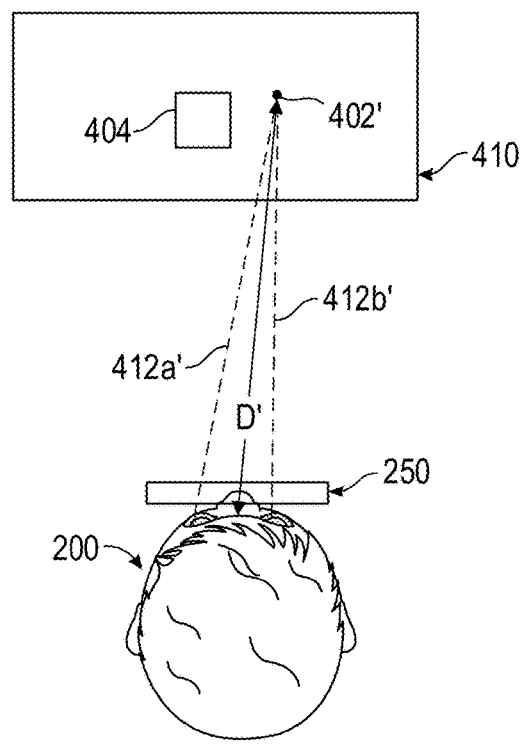

FIGS. 4 and 5 depict electronic device 250 with display 255 and camera(s) 260 (e.g., similar to image sensor(s) 108). In some embodiments, electronic device 250 displays three-dimensional computer-generated reality environment 400, which includes physical box 404 and virtual box 406 positioned on physical table 410, and virtual display UI 408 rendered in the computer-generated reality environment. Physical box 404 is positioned on physical table 410 having a first distance from user 200, and virtual box 406 is positioned on physical table 410 slightly behind physical box 404 and having a second distance from user 200. In the embodiment illustrated in FIGS. 4 and 5, display 255 of device 250 shows computer-generated reality environment 400 from the general perspective of user 200, and virtual box 406 has an unknown depth value in computer-generated reality environment 400.

In the embodiments illustrated in FIGS. 4 and 5, display 255 is a transparent display through which the physical environment is visible and upon which virtual objects are displayed. For example, physical table 410 and physical box 404 are visible through the transparent display 255, whereas virtual box 406 and virtual display UI 408 are rendered on display 255 positioned relative to the physical objects (e.g., 404, 410). In other embodiments, device 250 can include an opaque display that includes two display regions and two or more scene cameras providing a stereoscopic view. The stereoscopic view enables an environment in which the user's gaze focuses beyond the distance of the device's display screen, thereby facilitating position estimation utilizing the techniques disclosed herein.

Computer-generated reality environment 400 is shown on display 255 of device 250. In some embodiments, when viewing the computer-generated reality environment using display 255 of device 250, at least a portion of the computer-generated reality environment is shown from the perspective of an image sensor (e.g., a front-facing camera) (e.g., 108) used to capture imagery from the physical environment. In some embodiments, when viewing the computer-generated reality environment using display 255 of device 250, at least a portion of the computer-generated reality environment represented on display 255 is adjusted so that the computer-generated reality environment is shown from an approximated perspective of the user's eyes, rather than the perspective of the image sensor, which is offset from the perspective of the user's eyes. For example, if the position of the image sensor is two inches higher than the position of the user's eyes, and one inch away from the plane of the user's face, the representation of the computer-generated reality environment on display 255 can be adjusted using distance D, as discussed in greater detail below, so that displayed portions of the environment are shown as being two inches lower than the position of the image sensor and one inch closer to the plane of the user's face. This adjustment presents the computer-generated reality environment to the user in a manner that more accurately reflects the perspective of the user's eyes.

FIG. 4 also depicts an overhead view of the physical environment that includes user 200 and physical objects (e.g., 250, 404, 410) (note virtual objects such as virtual box 406 and virtual display UI 408 are not displayed in the overhead view of the physical environment). The gaze of each of the user's eyes is represented in the overhead view by vectors 412a and 412b, and the point of convergence of the user's gaze is represented in both the physical environment and the computer-generated reality environment by point 402. The gaze of each eye, and the point of convergence 402, are extrapolated onto a plane of the displayed representation of computer-generated reality environment 400, which corresponds to the plane of display 255 of device 250. It should be understood that vectors 412a and 412b and point 402 are not visible in the physical environment, but are illustrated in the figures to support the described embodiments. In some embodiments, device 250 can optionally display point 402 as a virtual object in computer-generated reality environment 400.

Using one or more of the techniques discussed above, device 250 determines the directions of gaze (e.g., 412a and 412b) for the user's eyes, determines point 402 at which the gaze vectors converge, and determines distance D to point 402. In the embodiment illustrated in FIG. 4, user 200 is looking at physical box 404, thus the location of the convergence point 402 corresponds to the location of physical box 404 in computer-generated reality environment 400.

Because point 402 corresponds to the location of physical box 404 in the computer-generated reality environment, device 250 determines a position of physical box 404 in the computer-generated reality environment 400 by calculating distance D between user 200 and point 402. In accordance with one or more embodiments disclosed herein, this determination includes device 250 determining the direction of gaze (represented by vectors 412a and 412b in FIG. 4) for each of the user's eyes (for example, by modeling the vectors using one or more of the methods described above with respect to FIGS. 3A and 3B) and determining the point of convergence (e.g., point 402) of the vectors, as discussed above.

In some embodiments, device 250 continuously determines the user's gaze and updates the convergence point and calculated position of the convergence of the gaze to continuously update the calculated position (e.g., distance or depth) of the user's gaze. In some embodiments, this updated distance can be used to place virtual objects in the computer-generated reality environment at a desired location (e.g., a location corresponding to the convergence of the user's gaze). For example, FIG. 5 shows an embodiment similar to that in FIG. 4 where the user's gaze has moved from physical box 404 to a different location (e.g., 402'), and the device has placed an object (e.g., virtual box 406) at a location coincident with the updated location of the user's gaze. Device 250 determines updated vectors 412a' and 412b' and updated convergence point 402' based on detected changes in the position of the user's eyes, and recalculates the distance to determine updated distance D' of the user's focus (e.g., at convergence point 402'). In some embodiments, vectors 412a and 412a' correspond to vectors 310b and/or 325b of FIGS. 3A and 3B, and vectors 412b and 412b' correspond to vectors 310a and/or 325a of FIGS. 3A and 3B.

In some embodiments, the device can display at the location of the user's gaze a virtual object such as virtual box 406, which, in the embodiment illustrated in FIG. 5, is a virtual representation of physical box 404. In some instances, this action may be triggered by a user input, such as a request to display an object. In the embodiment illustrated in FIG. 5, device 250 calculates updated distance D' between user 200 and updated point 402' (the updated convergence point of the user's gaze), and displays virtual box 406 in computer-generated reality environment at the location of updated point 402'. Device 250 determines updated distance D', and uses this distance to determine the appropriate dimensions of virtual box 406 in order to render a virtual representation of the physical box 404 in computer-generated reality environment 400.

It should be appreciated that device 250 can implement the techniques disclosed herein to determine the position of any object in the computer-generated reality environment, including physical objects (e.g., as described with respect to FIG. 4) and virtual objects (e.g., as described with respect to FIG. 5). Thus, the disclosed techniques for estimating the position of an object in a computer-generated reality environment can be used to estimate the position of physical objects and virtual objects in the computer-generated reality environment.

In some embodiments, device 250 performs a task after determining the position (e.g., distance, depth) of an object in the computer-generated reality environment. Non-limiting examples of such a task include generating a three-dimensional reconstruction of the real environment, displaying a representation of the distance or depth of the object, determining a change in the position (e.g., in response to movement of the object, user, device, gaze, or a combination thereof), refining a focus of an image captured by device 250, adjusting an image display of device 250 based on the position, generating a visual, audio, and/or haptic output, determining a spatial characteristic of the object such as a scale, position, depth, distance, or orientation of the object, performing object tracking, providing scale for visual odometry, and providing scale to any point-based or feature-based computer vision application that is missing depth values.

In the embodiments illustrated in FIGS. 4 and 5, device 250 performs the task of generating a virtual object to display the real-time distance (e.g., D or D') to the convergence point (e.g., 402 or 402') and, by association, the corresponding object (e.g., 404 or 406) in the environment. For example, in FIG. 4, device 250 displays virtual display UI 408 on display 255, which provides a visual indication of distance D to physical box 404. Virtual display UI 408 includes a virtual representation of the distance to point 402, which is displayed as "12.3'," and, optionally, a virtual tether portion 408-1 connecting to the location of point 402. In the embodiment illustrated in FIG. 4, point 402 is optionally displayed as a virtual object in environment 400.

Similarly, in FIG. 5, device 250 displays updated virtual display UI 408' on display 255, which provides a visual indication of updated distance D' to virtual box 406. Updated virtual display UI 408' includes a virtual representation of distance D' to updated convergence point 402', which is displayed as "13.1'," and, optionally, updated virtual tether portion 408-1' connecting to the location of updated point 402'. In the embodiment illustrated in FIG. 5, updated convergence point 402' is optionally displayed as a virtual object in environment 400.

In some embodiments, device 250 uses an image sensor (e.g., image sensor 108), such as a front-facing camera, to capture imagery from the real environment. In such embodiments, device 250 may use the determined distance D of the user's gaze (and any objects associated with the position of the user's gaze) to refine a focus of the imagery captured using the front-facing camera. For example, referring again to FIG. 4, when device 250 determines the position of physical box 404, device 250 can adjust the focus of a front-facing camera capturing the physical environment based on the determined distance D. In this way, the focus of the camera is enhanced at physical box 404 and the portion of physical table 410 upon which physical box 404 is positioned. In some embodiments, this image refinement can include blurring or otherwise defocusing other displayed portions of the computer-generated reality environment. For example, in the embodiment of FIG. 4, this would include blurring virtual box 406 and/or the back portion of physical table 410 that is located away from physical box 404. Conversely, in the embodiment of FIG. 5, this would include blurring physical box 404 and, optionally, the front portion of physical table 410 that is located near physical box 404. In some embodiments, the image refinement can also include enhancing displayed attributes (e.g., sharpness, contrast, color, brightness, focus, etc.) of virtual objects (e.g., 406 in FIG. 5) on which the user is focusing. These actions can enhance the displayed representation of the computer-generated reality environment such that device 250 enhances display of the objects (and, optionally, the surrounding environment) upon which the user is focusing and, optionally, obscuring displayed portions of the environment upon which the user is not focusing.

In some embodiments, device 250 can use the determined distance D to adjust the displayed representation of computer-generated reality environment 400 to account for an offset between a position of the user's eyes and a position of a front-facing camera or any other image sensor (e.g., image sensor(s) 108) used to capture imagery of the physical environment. For example, device 250 can calculate a vertical and/or horizontal offset from the position of the user's eyes and the position of the front-facing camera, and adjust (e.g., warp) the displayed image of the computer-generated reality environment such that at least a portion of the image displayed on display 255 of device 250 is represented from the point-of-view of the user's eyes, rather than the point-of-view of the front-facing camera. For example, device 250 can identify a depth plane at distance D, and then use the calculated distance D to adjust the images displayed in the computer-generated reality environment to align objects present in the identified depth plane based on the calculated offset. This results in the proper displayed alignment of objects in the depth plane corresponding to the user's focus.

It should be recognized that the embodiments discussed above with respect to FIGS. 2-5 are exemplary and are not intended to be limiting.

Figure 6:
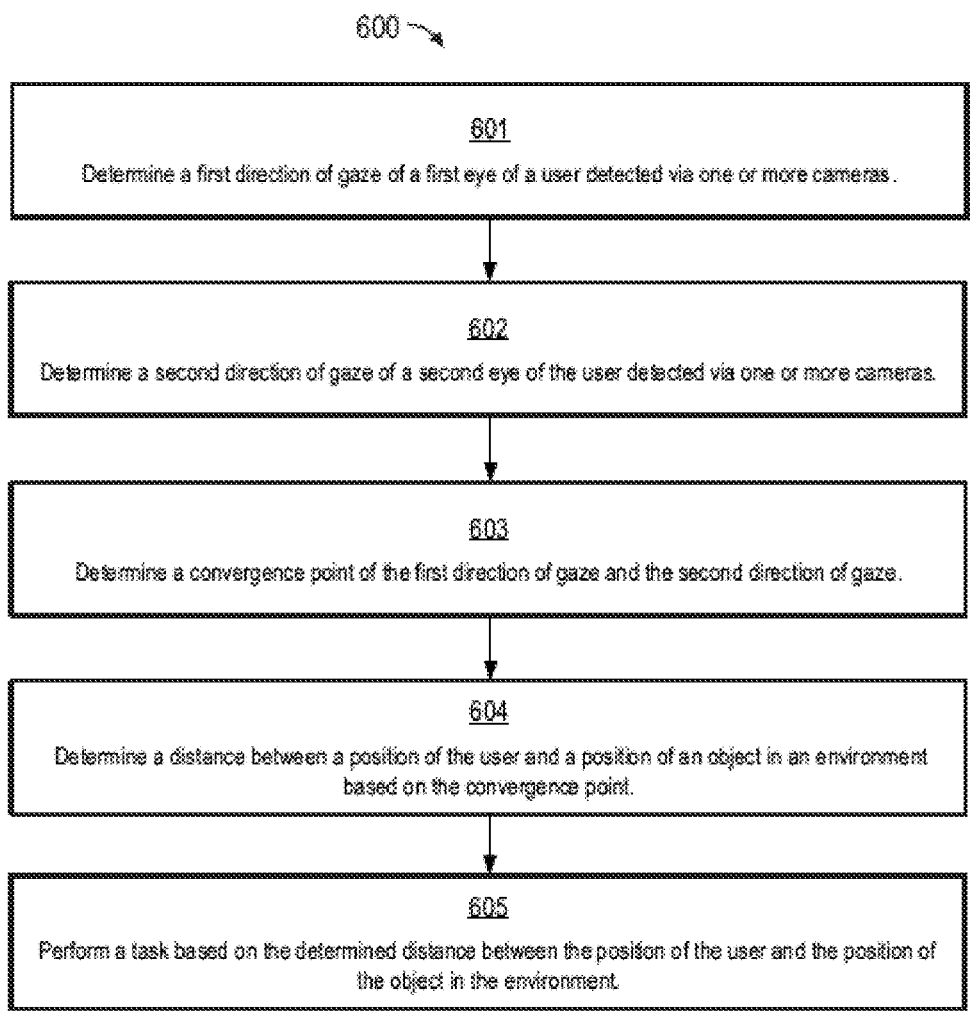
FIG. 6 illustrates a flow chart of an exemplary process for determining a position of an object in an environment using an eye gaze, according to various embodiments.

Turning now to FIG. 6, a flow chart is depicted for an exemplary process 600 for determining a position (e.g., distance, depth, etc.) of an object in an environment using an eye gaze. Process 600 can be performed using an electronic device (e.g., 100a or 250) having one or more cameras (e.g., 108, 260). The user device is, for example, a handheld mobile device, a head-mounted device, or a head-up device. It should be recognized that, in other embodiments, process 600 is performed using two or more electronic devices, such as a user device that is communicatively coupled to another device, such as a base device. In these embodiments, the operations of process 600 are distributed in any manner between the user device and the other device. Further, it should be appreciated that the display of the user device can be transparent or opaque. It should also be appreciated that process 600 can be applied to objects that correspond to virtual objects or physical objects. Although the blocks of process 600 are depicted in a particular order in FIG. 6, it should be appreciated that these blocks can be performed in other orders. Further, one or more blocks of process 600 can be partially performed, optionally performed, combined with another block(s), and/or additional blocks can be performed.

At block 601, the device (e.g., 100a, 250) determines a first direction of gaze (e.g., 222, 412b, 412b') (e.g., a direction in which the eye is focused or looking) of a first eye (e.g., 300a) of a user detected via one or more cameras (e.g., 108, 260). In some embodiments, the one or more cameras include an infrared camera, an event camera, and/or an RGB camera. In some embodiments, the device includes a front-facing camera.

At block 602, the device determines a second direction of gaze (e.g., 221, 412a, 412a') of a second eye (e.g., 300b) of the user detected via the one or more cameras.

In some embodiments, determining the first direction of gaze of the first eye (or the second direction of gaze of the second eye) includes one or more of the following steps: detecting, via the one or more cameras, a reflection (e.g., 302a, 302b) (e.g., pupil center corneal reflection) on the first (or second) eye; detecting, via the one or more cameras, a center location (e.g., 304a, 304b) of a pupil of the first (or second) eye; determining a first vector (e.g., 308a, 308b) from the reflection (e.g., a center location of the reflection) on the first (or second) eye to the center of the pupil of the first (or second) eye; and determining a gaze vector (e.g., 310a, 310b) based on the first vector (e.g., using polynomial functions or a generated geometrical model of the eyeball). In some embodiments, the reflection is a pupil center corneal reflection.

In some embodiments, determining the second direction of gaze of the second eye (or the first direction of gaze of the first eye) includes one or more of the following steps: detecting, via the one or more cameras, a center location (e.g., 304a, 304b) of a pupil of the second (or first) eye; determining a center point (e.g., 320a, 320b) (e.g., a projected or modeled center of the eyeball) of the second (or first) eye; and determining a vector (e.g., 325a, 325b) from the center point of the second (or first) eye and through the center location of the pupil of the second (or first) eye (e.g., a vector is determined from the projected center of the eyeball through the center of the pupil).

At block 603, the device determines a convergence point (e.g., 210, 402, 402') (e.g., a location at which the first direction of gaze and the second direction of gaze intersect along at least one plane, or a location of minimum distance between the first and second directions of gaze) of the first direction of gaze (e.g., 222, 412b, 412b') and the second direction of gaze (e.g., 221, 412a, 412a'). In some embodiments, determining the convergence point includes projecting a first vector (e.g., 310a, 325a) along the first direction of gaze of the first eye (e.g., 300a) and projecting a second vector (e.g., 310b, 325b) along the second direction of gaze of the second eye (e.g., 300b). In some embodiments, determining the convergence point further includes determining an intersection region (e.g., 210, 402, 402') (e.g., a location at which a distance between the first and second vectors is least; a location at which the first and second vectors intersect along at least one plane) of the first and second vectors, and determining the convergence point based on the intersection region of the first and second vectors. In some embodiments, a distance (e.g., D) between the position of the user and the position of an object (e.g., 404, 406) in an environment can be determined by determining a distance between the position of the user and a position of the intersection region of the first and second vectors.

At block 604, the device determines a distance (e.g., D, D') between a position of the user (e.g., a determined position of the user in an environment) and a position of an object (e.g., 404, 406) in an environment (e.g., 400) based on the convergence point (e.g., 402, 402') (e.g., the position of the object is determined to be co-located with the convergence point in the environment). In some embodiments, the position of the user is determined to be a location in the environment that is associated with a position of the electronic device (e.g., 250) in the environment. In some embodiments, the environment is a computer-generated reality environment.

In some embodiments, determining the distance (e.g., D, D') between the position of the user (e.g., 200) and the position of the object (e.g., 404, 406) includes obtaining an interpupillary distance (e.g., the distance between the pupils of the first and second eyes) between the first eye (e.g., 300a) of the user and the second eye (e.g., 300b) of the user, and determining the distance between the position of the user and the position of the object using the interpupillary distance.

At block 605, the device performs a task (e.g., displaying a representation of the distance, determining a change in the distance, etc.) based on the determined distance (e.g., D, D') between the position of the user (e.g., 200) and the position of the object (e.g., 404, 406) in the environment (e.g., 400). In some embodiments, the task includes refining a focus of an image capture device (e.g., a camera; a front-facing camera) based on the determined distance. In some embodiments, the task includes obtaining an offset (e.g., a distance representing a horizontal and/or vertical offset from the position of a front-facing camera and the user's eyes) between a position of a second camera (e.g., a front-facing camera; e.g., a camera viewing the scene) and a position of at least one of the first eye or the second eye, and adjusting (e.g., warping) an image display of the electronic device based on the offset and the determined distance between the position of the user and the position of the object in the environment (e.g., warping the displayed image to account for the offset between the front-facing camera and the user's eyes so that the image displayed to the user is represented from the position of the user's eyes, instead of the position of the camera).

In some embodiments, the object is associated with the convergence point (e.g., 210, 402, 402') (e.g., the position of the object is co-located with the convergence point in the environment), and the task includes determining one or more spatial characteristics of the object based on the determined distance between the position of the user and the position of the object in the environment. In some embodiments, determining the one or more spatial characteristics of the object includes determining a scale of the object (e.g., a scale of the object in the environment) (e.g., providing a scale for visual odometry) (e.g., providing scale to any point-based or feature-based computer vision application that is missing depth values). In some embodiments, determining the one or more spatial characteristics of the object includes determining a pose (e.g., position/orientation) of the object (e.g., an orientation of the object in the environment). In some embodiments, determining the one or more spatial characteristics of the object includes determining a depth of the object in the environment. In some embodiments, the task includes tracking the object (e.g., based on detected changes to the convergence point associated with the object).

In conventional image-based computer vision applications, scale of objects in the environment are typically determined using a depth sensor or accelerometer. Alternatively, scale of an object is estimated by comparing a detected object to reference objects having a known size or scale. In the embodiments provided herein, however, the scale is determined using the calculated distance derived from the gaze of the user. Determining object scale using the calculated distance derived from the user's gaze eliminates the need for additional hardware (e.g., depth sensors, accelerometers) utilized in conventional image-based computer vision applications to determine the scale of objects in the environment. This technique also provides greater accuracy than estimations based on reference objects having a known size or scale.

Executable instructions for performing the features of method 600 described above are, optionally, included in a transitory or non-transitory computer-readable storage medium (e.g., memory(ies) 106) or other computer program product configured for execution by one or more processors (e.g., processor(s) 102).

With reference now to FIGS. 7A-7C and 8, exemplary techniques are described for generating a three-dimensional reconstruction of the physical environment using an eye gaze detected in accordance with the techniques discussed above with respect to FIGS. 2-6.

In some embodiments, the electronic device (e.g., device 250) reconstructs a representation of the real environment using the gaze detected for the user's eyes. For instance, the device detects the user's gaze (e.g., as discussed with respect to FIGS. 2-6) and determines the location of the user's gaze (e.g., the location at which the gaze of each eye intersect) in the real environment to produce one or more data points that correspond to locations in the real environment. These data points indicate a three-dimensional position at which the gaze of each of the user's eyes intersects (e.g., a location at which the user is focusing) in the real environment. The device then analyzes the data points derived from the intersection points of the user's gaze to generate a three-dimensional (e.g., stereoscopic) reconstruction of the real environment around the user. In some embodiments, the reconstruction of the real environment can be rendered in a computer-generated reality environment, as illustrated in FIGS. 7A-7C.

In some embodiments, reconstructing the real environment based on the data points associated with the detected user gaze allows the electronic device to reconstruct the user's real environment without using a front-facing camera (e.g., image sensor(s) 108). This conserves resources at least because the electronic device can reduce usage of the front-facing camera and/or use the front-facing camera for other purposes (e.g., thereby reducing and/or conserving its use by, for example, allowing for reduced use rate, frame rate, or resolution of the camera), or the front-facing camera can be eliminated from the electronic device altogether. Alternatively, in instances in which the electronic device does use a front-facing camera to reconstruct the user's real environment, the data points determined based on the detected user gaze can, optionally, be used to refine the data points of the reconstructed environment, thereby improving the reconstruction and/or rendering of the user's real environment. For example, surfaces that are challenging to detect or reconstruct using a front-facing camera (e.g., transparent, opaque, glossy, specular, textured, diffuse, translucent, or reflective surfaces) can be more accurately identified, reconstructed, or rendered using the data points determined by tracking the user's gaze, thereby increasing the quality of the reconstruction and any rendering of the reconstructed environment.

Figure 7A:
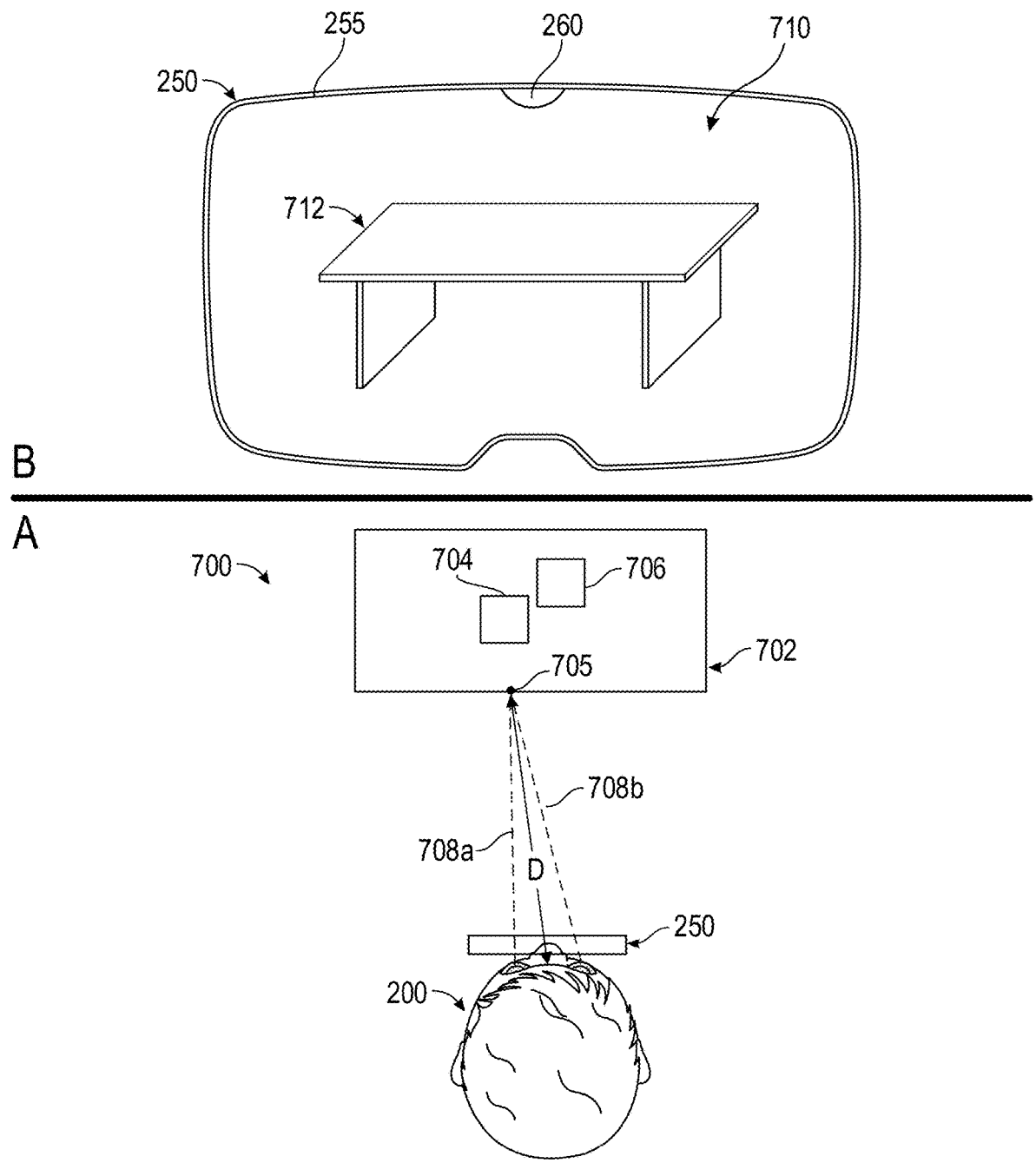
FIGS. 7A-7C illustrate an example process for generating a three-dimensional reconstruction of a real environment using eye gaze, according to various embodiments.
Figure 7B:
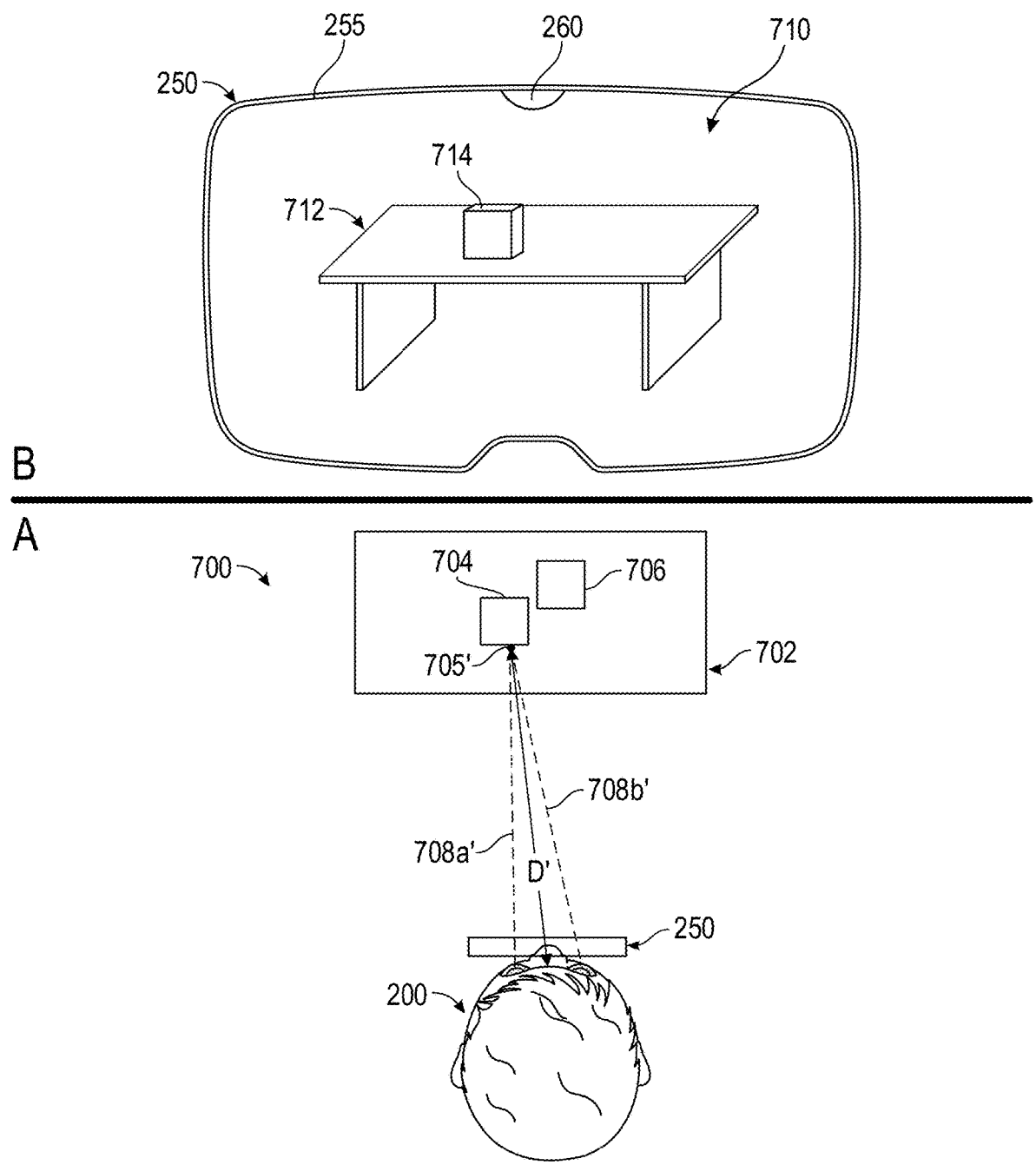
Figure 7C:
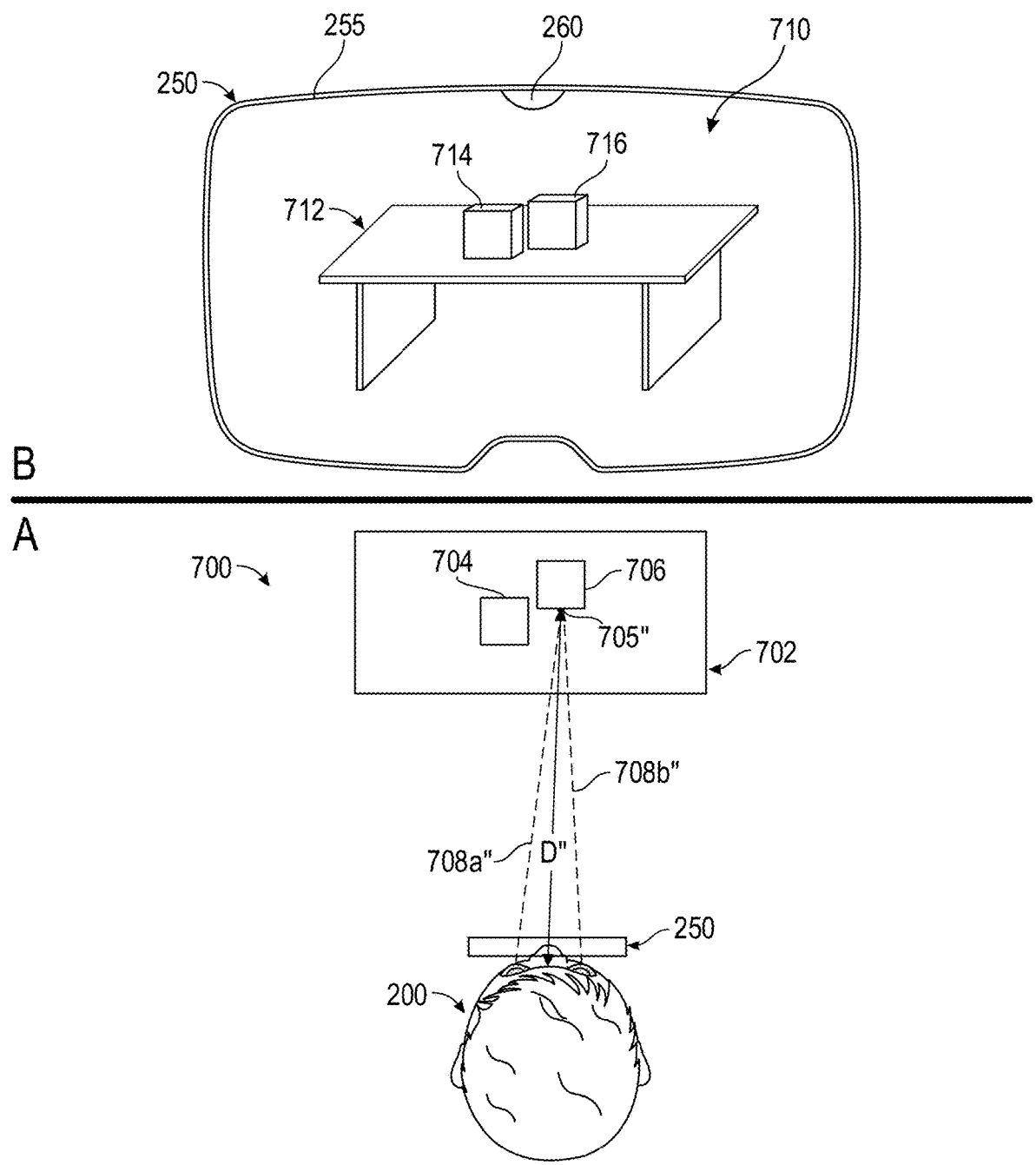

FIGS. 7A-7C illustrate an embodiment in which electronic device 250 is tracking the gaze of user 200 within the user's real environment 700 and generating a three-dimensional reconstruction of the real environment, which can optionally be displayed in computer-generated reality environment 710. Portion A of FIGS. 7A-7C depicts real environment 700 shown from an overhead view in which device 250 is positioned on user 200, and physical objects 704 and 706 are positioned on physical table 702. Portion B of FIGS. 7A-7C depicts electronic device 250, shown from the perspective of user 200. Device 250 is shown with display 255 and camera(s) 260, which is used to detect the user's eye gaze. Device 250 displays a representation of computer-generated reality environment 710 showing the portions of the real environment that have been reconstructed by device 250 for display in the computer-generated reality environment.

In some embodiments, display 255 can be a transparent display through which the physical environment is visible and upon which virtual objects are displayed. Accordingly, in some examples, device 250 does not display a rendering of the reconstructed environment, but rather reconstructs the environment used by device 250 to facilitate a user experience in the computer-generated reality environment 710.

In the embodiment illustrated and discussed with respect to FIGS. 7A-7C, device 250 does not include a front-facing camera (e.g., image sensor(s) 108) or use of such a camera is not invoked. Instead, device 250 reconstructs at least a portion of the real environment 700 and generates a three-dimensional rendering of the reconstructed environment for display in the computer-generated reality environment 710. In some examples, the rendering is generated based on the data points associated with the user's gaze as the user's gaze moves within environment 700, as described. Thus, as the user's gaze moves within (e.g., sweeps across) environment 700, device 250 determines data points associated with the location of the user's gaze and uses these data points to render a three-dimensional (e.g., stereoscopic) reconstruction of environment 700.

The reconstructed environment is illustrated by rendered objects (e.g., rendered objects 712, 714, 716) shown on display 255 of electronic device 250, which is displayed from the perspective of user 200. As device 250 continues to detect the user's gaze and gather additional data points, the reconstructed environment is continuously updated and displayed (e.g., re-rendered) in computer-generated reality environment 710 to reflect the continuous reconstruction of environment 700. Thus, computer-generated reality environment 710 is shown in various updated stages in FIGS. 7A-7C based on an instant state of the continuous gaze detection (and continuous collection of additional data points associated with the gaze detection) and reconstruction of the real environment using the data points associated with the gaze detection.

In FIG. 7A, electronic device 250 detects the user's gaze and generates a rendering of reconstructed table 712 based on data points collected from the intersection of the gaze vectors. The gaze of each of the user's eyes is represented in the overhead view by vectors 708a and 708b, and the point of convergence of the user's gaze is represented in real environment 700 by point 705. The gaze of each eye, and the point of convergence 705, are extrapolated onto a plane of computer-generated reality environment 710 relative, in some embodiments, to an instant position of user 200 when the convergence point is determined. It should be understood that vectors 708a and 708b and point 705 are not visible in the physical environment, but are illustrated in the figures to support the described embodiments. In some embodiments, device 250 can, optionally, display point 705 as a virtual object in computer-generated reality environment 710.

Using one or more of the techniques discussed above, device 250 determines the directions of gaze (e.g., 708a and 708b) for the user's eyes, determines point 705 at which the gaze vectors converge, and determines a distance D from the user (or device 250) to point 705. In the embodiment illustrated in FIG. 7A, user 200 is looking at physical table 702, thus the location of the convergence point 705 corresponds to a location of a portion of reconstructed table 712 in computer-generated reality environment 710. Convergence point 705 is a three-dimensional data point that is calculated by device 250 and used to generate the three-dimensional reconstruction of physical objects in computer-generated reality environment 710. Specifically, point 705 is used to reconstruct a location of a portion of physical table 702 in computer-generated reality environment 710, relative to, for example, a position of the user or, more specifically, the position of the user's head (e.g., as determined from a point equidistant between the user's eyes). Device 250 determines a location of a corresponding portion of reconstructed table 712 in computer-generated reality environment 710 by calculating distance D between user 200 (e.g., the user's head or device 250) and point 705. This distance is then used to calculate a corresponding location in computer-generated reality environment 710 that is determined based on the relative position of the user (e.g., including the position of the user's head or, optionally, the position of device 250) to the real object in real environment 700. In accordance with one or more embodiments disclosed herein, this determination includes device 250 determining the direction of gaze (represented by vectors 708a and 708b in FIG. 7A) for each of the user's eyes (for example, by modeling the vectors using one or more of the methods described above with respect to FIGS. 3A and 3B) and determining the point of convergence (e.g., point 705) of the vectors, as discussed above.

In some embodiments, the user's head moves as the device determines the point of convergence for the user's gaze, which may affect the determined location of the convergence point in the user's environment. To compensate for this movement of the user's head and the resulting potential inconsistency in calculating the convergence points, in some embodiments the device maps the determined convergence points to a consistent 3D coordinate frame that accounts for the user's head movement by tracking the head motion with respect to a reference coordinate frame (e.g., using Virtual Input/Output (VIO) or an external tracking system). The information obtained by tracking the head motion is then used to register the determined convergence points in the 3D coordinate frame to ensure that the convergence points are consistent with the 3D coordinate frame.

Device 250 continues to detect the user's gaze, calculate data points associated with the user's gaze, and use the data points to reconstruct the real environment the user is viewing. As shown in FIG. 7A, device 250 has detected the gazes of each of the user's eyes intersecting along table 702 and has collected enough data points to generate reconstructed table 712, which is displayed in computer-generated reality environment 710. For example, device 250 has detected the user's gaze focusing at a sufficient amount of locations on table 702 such that device 250 has calculated enough data points to implement a function, such as an interpolation function, to determine the shape of table 702 and reconstruct the table using the collected data points, which is displayed in computer-generated reality environment 710 as reconstructed table 712. Note that the user has not focused on physical objects 704 and 706. Accordingly, device 250 has not calculated data points at the locations of these objects and, therefore, has not generated a reconstruction of the physical objects to be rendered in computer-generated reality environment 710. Thus, computer-generated reality environment 710 only includes a rendering of reconstructed table 712, and no other objects.

Referring now to FIG. 7B, device 250 continues to detect the user's gaze, calculate convergence points (data points), and use the data points to continue reconstructing the real environment based on the user's gaze. FIG. 7B shows an embodiment in which device 250 calculates gaze vectors 708a' and 708b' and convergence point 705' having distance D' from user 200. As depicted in FIG. 7B, the user is looking at physical object 704. Accordingly, device 250 calculates gaze vectors 708a' and 708b' converging at point 705' associated with physical object 704 (e.g., located on a surface or edge of physical object 704). As the user's gaze moves to other portions of physical object 704, device 250 continues to calculate data points associated with the user's gaze, and uses these data points to generate reconstructed object 714, which is shown in computer-generated reality environment 710 on display 255. Note device 250 has updated computer-generated reality environment 710 to include both reconstructed table 712 and reconstructed object 714. However, because the user's gaze has not focused on physical object 706, device 250 has not reconstructed physical object 706 and, therefore, no representation of physical object 706 is shown in computer-generated reality environment 710.

Referring now to FIG. 7C, device 250 continues to detect the user's gaze, calculate convergence points (data points), and use the data points to continue reconstructing the real environment based on the user's gaze. FIG. 7C shows an embodiment in which device 250 calculates gaze vectors 708a" and 708b" and convergence point 705" having distance D" from user 200. In this embodiment, the user is looking at physical object 706. Accordingly, device 250 calculates gaze vectors 708a" and 708b" converging at point 705" located at physical object 706. As the user's gaze moves to other portions of physical object 706, device 250 continues to calculate data points associated with the user's gaze, and uses these data points to generate reconstructed object 716, which is shown in computer-generated reality environment 710 on display 255. Note device 250 has updated computer-generated reality environment 710 to include reconstructed table 712, reconstructed object 714, and reconstructed object 716.

In some embodiments, vectors 708a, 708a', and 708a" correspond to vectors 310b and/or 325b of FIGS. 3A and 3B, and vectors 708b, 708b', and 708b" correspond to vectors 310a and/or 325a of FIGS. 3A and 3B.

In some embodiments, device 250 filters data points to ensure that data points are calculated when the user's eyes are focused. For example, device 250 may discard data points determined to have an infinite distance from the user (e.g., the user's eyes are looking towards the horizon and not focused on an object in the user's vicinity). As another example, device 250 may discard data points for when a user's gaze is held in a direction for less than a threshold amount of time (e.g., less than 10 or 20 ms), such as when a user's gaze is moving (e.g., shifting) from a first object to a second object. In such instances, device 250 may forgo determining data points associated with the user's gaze for the period of time during which the user's gaze is moving from the first object to the second object. In some instances, however, the device may determine data points if the user's eyes are constantly shifting as long as the shifting gaze remains within a defined region. This allows the device to determine data points in a situation in which the user's gaze is continuously shifting, but directed to a generally consistent region or location in a physical environment.

In some embodiments, device 250 can use the data points calculated based on the user's eye gaze to refine a reconstruction of the user's physical environment. For example, in some embodiments, device 250 can use a front-facing camera (e.g., sensor(s) 108) to reconstruct a real environment. In such embodiments, some surfaces can be difficult to reconstruct using the front-facing camera. For example, a transparent, opaque, glossy, specular, textured, diffuse, translucent, or reflective surface such as a glass pane, mirror, or other such surface can be difficult to reconstruct because the front-facing camera faces challenges with detecting the surface, which can almost appear "invisible" to the front-facing camera. A user's eyes, however, are capable of focusing on locations associated with the surface, such as a blemish on a mirror, a frame around a glass pane, or any other object that is coplanar (e.g., co-located) with the surface. In such instances, device 250 can track the user's gaze as the user focuses on these locations, calculate data points corresponding to the intersection of the user's gaze, and then use the data points to refine data points of the reconstructed environment so that the reconstructed environment more accurately represents the user's real environment. Using the user's eye gaze to refine the reconstructed environment can improve the reconstruction and, optionally, rendering of the user's real environment.

For example, suppose device 250 uses a front-facing camera to detect an environment having a mirrored surface mounted on a wall. In some instances, device 250 is not capable of identifying the mirror as a reflective surface and, instead, incorrectly considers the surface of the mirror to be an opening in the wall (e.g., a window or opening to another room). By tracking the user's gaze, device 250 is capable of calculating data points that correspond to the location of the mirrored surface when the user is looking at various features of the mirror that are coplanar with the surface of the mirror (e.g., the edges of the mirror, a smudge or blemish on the glass, etc.). Device 250 then uses these calculated data points to refine the reconstructed environment to recognize that the "opening" is, in fact, a surface.

It should be recognized that the embodiments discussed above are exemplary and are not intended to be limiting.

Figure 8:
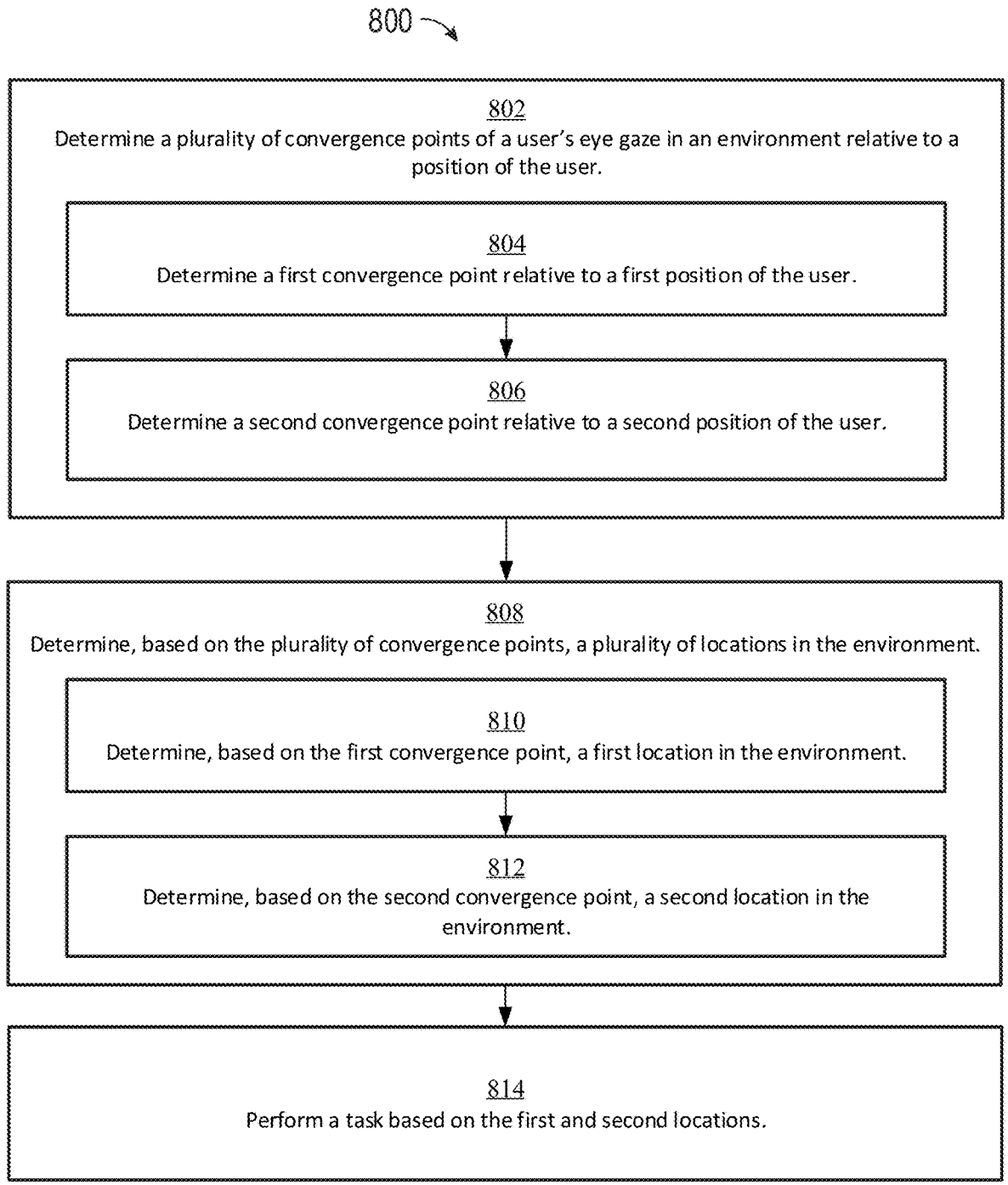
FIG. 8 illustrates a flow chart of an exemplary process for generating a three-dimensional reconstruction of a real environment using eye gaze, according to various embodiments.

Turning now to FIG. 8, a flow chart is depicted for an exemplary process 800 for generating a three-dimensional reconstruction of a real environment using eye gaze. Process 800 can be performed using an electronic device (e.g., 100*a* or 250) having one or more cameras (e.g., 108, 260). The user device is, for example, a handheld mobile device, a head-mounted device, or a head-up device. It should be recognized that, in other embodiments, process 800 is performed using two or more electronic devices, such as a user device that is communicatively coupled to another device, such as a base device. In these embodiments, the operations of process 800 are distributed in any manner between the user device and the other device. Although the blocks of process 800 are depicted in a particular order in FIG. 8, it should be appreciated that these blocks can be performed in other orders. Further, one or more blocks of process 800 can be partially performed, optionally performed, combined with another block(s), and/or additional blocks can be performed.

At block 802, the device (e.g., 100*a*, 250) determines a plurality of convergence points (e.g., 705, 705', 705") (e.g., locations at which a first direction of gaze (e.g., 708*a*, 708*a'*, 708*a"*) of a user's eye (e.g., a direction in which a first eye of the user (e.g., 200) is focused or looking) and a second direction of gaze (e.g., 708*b*, 708*b'*, 708*b"*) of a user's eye (e.g., a direction in which a second eye of the user is focused or looking) intersect along at least one plane) of a user's eye gaze in an environment (e.g., 700; 710) relative to a position of the user (e.g., a determined position of the user in a computer-generated reality environment). In some embodiments, the position of the user is determined to be a location in the computer-generated reality environment that is associated with a position of an HMD in the computer-generated reality environment. In some embodiments, the environment is a computer-generated reality environment (e.g., 710).

At block 804, the device (e.g., 100*a*, 250) determines a first convergence point (e.g., 705) relative to a first position of the user.

At block 806, the device (e.g., 100*a*, 250) determines a second convergence point (e.g., 705') (e.g., different from the first convergence point) relative to a second position of the user.

In some embodiments, the second position of the user is a same position as the first position of the user (e.g., the user is standing still when the device (e.g., 100*a*, 250) determines the first and second convergence points (e.g., 705 and 705')).

In some embodiments, the second position of the user is a different position than the first position of the user (e.g., the user moves after the device determines the first convergence point and prior to determining the second convergence point).

In some embodiments, determining the first convergence point (e.g., 705) (e.g., and/or second convergence point (e.g., 705')) includes projecting a first gaze vector (e.g., 708*a*) along a direction of gaze of a first eye (e.g., from the first eye at the first position of the user when determining the first convergence point; e.g., from the first eye at the second position of the user when determining the second convergence point); and projecting a second gaze vector (e.g., 708*b*) along a direction of gaze of a second eye (e.g., from the second eye at the first position of the user when determining the first convergence point; e.g., from the second eye at the second position of the user when determining the second convergence point).

In some embodiments, determining the first convergence point (e.g., 705) (e.g., and/or second convergence point (e.g., 705') further includes: determining an intersection region (e.g., a location at which a distance between the first and second gaze vectors is least; a location at which the first and second gaze vectors intersect along at least one plane) of the first and second gaze vectors (e.g., 708*a* and 708*b*); and determining the first convergence point (e.g., and/or second convergence point) based on the intersection region of the first and second gaze vectors (e.g., wherein the first/second convergence point is determined to be a point in the environment that corresponds to the intersection region of the first and second gaze vectors and is determined with respect to the first or second position of the user in the environment).

In some embodiments, determining the plurality of convergence points of the user's eye gaze includes: determining (e.g., for each convergence point) a direction of gaze (e.g., 708*a*) of a first eye of the user; and determining (e.g., for each convergence point) a direction of gaze (e.g., 708*b*) of a second eye of the user. In some embodiments, the first convergence point (e.g., 705) is determined based on a first direction of gaze of the first eye (e.g., 708*a*) and a first direction of gaze of the second eye (e.g., 708*b*).

In some embodiments, the second convergence point (e.g., 705') is determined based on a second direction of gaze of the first eye (e.g., 708*a'*) (e.g., different from the first direction of gaze of the first eye) and a second direction of gaze of the second eye (e.g., 708*b'*) (e.g., different from the first direction of gaze of the second eye).

In some embodiments, at least one of determining the direction of gaze of the first eye (e.g., 708*a*) and determining the direction of gaze of the second eye (e.g., 708*b*) includes using one or more cameras (e.g., 260) (e.g., an IR camera, an event camera, an RGB camera, a camera facing the user's eyes, not a front-facing camera (a camera capturing the environment) of the device) to detect one or more characteristics of at least one of the first eye and the second eye. In some embodiments, the one or more characteristics include one or more items selected from a group consisting of: a reflection, a pupil, a center location of the pupil, a relative position of the pupil, a distance between the first eye and the second eye, a measurement of the first eye, and a measurement of the second eye. In some embodiments, the one or more cameras include one or more of an infrared camera, an event camera, and an RGB camera.

In some embodiments, determining the direction of gaze of the first eye (e.g., 708*a*) (e.g., and/or second eye (e.g., 708*b*)) includes: detecting (e.g., via one or more cameras (e.g., user-facing cameras, 260) of the electronic device 250)

a center location (e.g., 304a, 304b) of a pupil of the first eye (e.g., and/or second eye); determining a center point (e.g., 320a, 320b) (e.g., a projected or modeled center of the eyeball) of the first eye (e.g., and/or second eye); and determining a vector (e.g., 325a, 325b) from the center point of the first eye (e.g., and/or second eye) (e.g., a vector is determined from the projected center of the eyeball through the center of the pupil) and through the center location of the pupil of the first eye (e.g., and/or second eye).

In some embodiments, determining the direction of gaze of the first eye (e.g., and/or second eye) includes: detecting (e.g., via one or more cameras (e.g., user-facing cameras) of the electronic device) a reflection (e.g., 302a, 302b) (e.g., pupil center corneal reflection) on the first eye (e.g., and/or second eye); detecting (e.g., via one or more cameras (e.g., user-facing cameras) of the electronic device, 260) a center location (e.g., 304a, 304b) of a pupil of the first eye (e.g., and/or second eye); determining a first vector (e.g., 308a, 308b) from the reflection (e.g., a center location of the reflection) on the first eye (e.g., and/or second eye) to the center of the pupil of the first eye (e.g., and/or second eye); and determining a gaze vector (e.g., 310a, 310b) based on the first vector (e.g., using polynomial functions or a generated geometrical model of the eyeball). In some embodiments, the reflection is a pupil center corneal reflection.

At block 808, the device (e.g., 100a, 250) determines, based on the plurality of convergence points (e.g., 705, 705', 705"), a plurality of locations in the environment (e.g., 700, 710) (e.g., one or more locations in the environment that correspond to locations of the plurality of convergence points determined using the position of the user at the time the convergence points were determined). In some embodiments, convergence points are determined relative to the position of the user at the time the convergence points are determined (measured), and locations are absolute coordinates in the environment that are determined using the convergence points (e.g., based on the position of user when the convergence points were determined)).

At block 810, the device (e.g., 100a, 250) determines, based on the first convergence point (e.g., 705), a first location (e.g., 712) in the environment (e.g., 710) (e.g., a location in the environment that corresponds to a location of the first convergence point). In some embodiments, the first location is defined independent of the relative position of the user in the environment (e.g., defined using Cartesian coordinates with a point of origin that is not the location of the user). In some embodiments, the first location is defined with respect to the relative position of the user in the environment (e.g., defined using Cartesian coordinates with a point of origin that is based on the location of the user).

At block 812, the device (e.g., 100a, 250) determines, based on the second convergence point (e.g., 705'), a second location in the environment (e.g., 714) (e.g., a location in the environment that corresponds to a location of the second convergence point). In some embodiments, the second location is defined independent of the relative position of the user in the environment (e.g., defined using Cartesian coordinates with a point of origin that is not the location of the user). In some embodiments, the second location is defined with respect to the relative position of the user in the environment (e.g., defined using Cartesian coordinates with a point of origin that is based on the location of the user).

At block 814, the device (e.g., 100a, 250) performs a task based on the first and second locations.

In some embodiments, the task includes identifying one or more objects (e.g., 712, 714, 716) in the environment (e.g., without using information from a front-facing camera or any other device for observing or detecting the environment or scene). In some embodiments, the one or more objects include an object having a surface with one or more optical characteristics selected from the group consisting of: transparent (e.g., a clear surface such as glass), opaque (e.g., semi-transparent, translucent), glossy (e.g., a paint finish on a wall), specular, textured (e.g., a wall texture), diffuse, translucent, and reflective (e.g., a mirror; e.g., a transparent or opaque surface having a reflection (e.g., a clear glass surface with a reflection)).

In some embodiments, the task includes generating a representation (e.g., 712, 714, 716) (e.g., a shape) of at least a portion of the environment (e.g., objects (faces or surfaces) in the environment) using the plurality of locations in the environment. In some embodiments, the representation includes a three-dimensional (e.g., stereoscopic) reconstruction of at least a portion of the environment generated using at least the first and second locations.

In some embodiments, the task includes associating an object in the environment with the first and second locations (e.g., the position of the object is co-located with the first and second convergence points in the environment); and determining one or more spatial characteristics of the object based on a determined distance between the position of the user and at least one of the first and second locations. In some embodiments, determining the one or more spatial characteristics of the object includes determining a scale of the object (e.g., a scale of the object in the environment). In some embodiments, determining the one or more spatial characteristics of the object includes determining a pose (e.g., position/orientation) of the object (e.g., an orientation of the object in the environment).

Executable instructions for performing the features of method 800 described above are, optionally, included in a transitory or non-transitory computer-readable storage medium (e.g., memory(ies) 106) or other computer program product configured for execution by one or more processors (e.g., processor(s) 102).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
  one or more cameras;
  one or more processors; and
  memory storing one or more programs configured to be executed by the one or more processors, the one or more programs including instructions for:
    determining a first direction of gaze of a first eye of a user detected via the one or more cameras;
    determining a second direction of gaze of a second eye of the user detected via the one or more cameras;
    determining a convergence point of the first direction of gaze and the second direction of gaze;
    determining a distance between a position of the user and a position of an object in an environment based on the convergence point; and
    performing a task based on the determined distance between the position of the user and the position of the object in the environment, wherein the task includes:
      obtaining an offset between a position of a second camera and a position of at least one of the first eye or the second eye; and adjusting an image display of the electronic device based on the offset and the determined distance between the position of the user and the position of the object in the environment.

2. The electronic device of claim 1, wherein determining the first direction of gaze of the first eye includes:
   detecting, via the one or more cameras, a reflection on the first eye;
   detecting, via the one or more cameras, a center location of a pupil of the first eye;
   determining a first vector from the reflection on the first eye to the center of the pupil of the first eye; and
   determining a gaze vector based on the first vector.

3. The electronic device of claim 2, wherein the reflection is a pupil center corneal reflection.

4. The electronic device of claim 1, wherein determining the second direction of gaze of the second eye includes:
   detecting, via the one or more cameras, a center location of a pupil of the second eye;
   determining a center point of the second eye; and
   determining a vector from the center point of the second eye and through the center location of the pupil of the second eye.

5. The electronic device of claim 1, wherein the one or more cameras includes an infrared camera.

6. The electronic device of claim 1, wherein determining the convergence point includes:
   projecting a first vector along the first direction of gaze of the first eye; and
   projecting a second vector along the second direction of gaze of the second eye.

7. The electronic device of claim 6, wherein determining the convergence point further includes:
   determining an intersection region of the first and second vectors; and
   determining the convergence point based on the intersection region of the first and second vectors.

8. The electronic device of claim 7, wherein determining the distance between the position of the user and the position of the object includes:
   determining a distance between the position of the user and a position of the intersection region of the first and second vectors.

9. The electronic device of claim 1, wherein determining the distance between the position of the user and the position of the object includes:
   obtaining an interpupillary distance between the first eye of the user and the second eye of the user; and
   determining the distance between the position of the user and the position of the object using the interpupillary distance.

10. The electronic device of claim 1, wherein:
    the object is associated with the convergence point; and
    the task includes determining one or more spatial characteristics of the object based on the determined distance between the position of the user and the position of the object in the environment.

11. The electronic device of claim 10, wherein determining the one or more spatial characteristics of the object includes determining a scale of the object.

12. The electronic device of claim 10, wherein determining the one or more spatial characteristics of the object includes determining a pose of the object.

13. The electronic device of claim 1, wherein the task includes refining a focus of an image capture device based on the determined distance.

14. The electronic device of claim 1, wherein the environment is a computer-generated reality environment.

15. A non-transitory computer-readable storage medium storing one or more programs configured to be executed by one or more processors of an electronic device with one or more cameras, the one or more programs including instructions for:
    determining a first direction of gaze of a first eye of a user detected via the one or more cameras;
    determining a second direction of gaze of a second eye of the user detected via the one or more cameras;
    determining a convergence point of the first direction of gaze and the second direction of gaze;
    determining a distance between a position of the user and a position of an object in an environment based on the convergence point; and
    performing a task based on the determined distance between the position of the user and the position of the object in the environment, wherein the task includes:
       obtaining an offset between a position of a second camera and a position of at least one of the first eye or the second eye; and
       adjusting an image display of the electronic device based on the offset and the determined distance between the position of the user and the position of the object in the environment.

16. The non-transitory computer-readable storage medium of claim 15, wherein determining the first direction of gaze of the first eye includes:
    detecting, via the one or more cameras, a reflection on the first eye;
    detecting, via the one or more cameras, a center location of a pupil of the first eye;
    determining a first vector from the reflection on the first eye to the center of the pupil of the first eye; and
    determining a gaze vector based on the first vector.

17. The non-transitory computer-readable storage medium of claim 15, wherein determining the second direction of gaze of the second eye includes:
    detecting, via the one or more cameras, a center location of a pupil of the second eye;
    determining a center point of the second eye; and
    determining a vector from the center point of the second eye and through the center location of the pupil of the second eye.

18. The non-transitory computer-readable storage medium of claim 15, wherein determining the convergence point includes:
    projecting a first vector along the first direction of gaze of the first eye;
    projecting a second vector along the second direction of gaze of the second eye;
    determining an intersection region of the first and second vectors; and
    determining the convergence point based on the intersection region of the first and second vectors.

19. The non-transitory computer-readable storage medium of claim 15, wherein determining the distance between the position of the user and the position of the object includes:
    obtaining an interpupillary distance between the first eye of the user and the second eye of the user; and
    determining the distance between the position of the user and the position of the object using the interpupillary distance.

20. A method, comprising:
at an electronic device having one or more cameras:
determining a first direction of gaze of a first eye of a user detected via the one or more cameras;
determining a second direction of gaze of a second eye of the user detected via the one or more cameras;
determining a convergence point of the first direction of gaze and the second direction of gaze;
determining a distance between a position of the user and a position of an object in an environment based on the convergence point; and
performing a task based on the determined distance between the position of the user and the position of the object in the environment, wherein the task includes:
obtaining an offset between a position of a second camera and a position of at least one of the first eye or the second eye; and
adjusting an image display of the electronic device based on the offset and the determined distance between the position of the user and the position of the object in the environment.

21. The method of claim 20, wherein determining the first direction of gaze of the first eye includes:
detecting, via the one or more cameras, a reflection on the first eye;
detecting, via the one or more cameras, a center location of a pupil of the first eye;
determining a first vector from the reflection on the first eye to the center of the pupil of the first eye; and
determining a gaze vector based on the first vector.

22. The method of claim 20, wherein determining the second direction of gaze of the second eye includes:
detecting, via the one or more cameras, a center location of a pupil of the second eye;
determining a center point of the second eye; and
determining a vector from the center point of the second eye and through the center location of the pupil of the second eye.

23. The method of claim 20, wherein determining the convergence point includes:
projecting a first vector along the first direction of gaze of the first eye;
projecting a second vector along the second direction of gaze of the second eye;
determining an intersection region of the first and second vectors; and
determining the convergence point based on the intersection region of the first and second vectors.

24. The method of claim 20, wherein determining the distance between the position of the user and the position of the object includes:
obtaining an interpupillary distance between the first eye of the user and the second eye of the user; and
determining the distance between the position of the user and the position of the object using the interpupillary distance.

25. The electronic device of claim 1, wherein:
determining a convergence point of the first direction of gaze and the second direction of gaze includes:
determining a first convergence point relative to a first position of the user; and
determining a second convergence point relative to a second position of the user;
determining a distance between a position of the user and a position of an object in an environment based on the convergence point includes:
determining, based on the first convergence point, a first location in the environment; and
determining, based on the second convergence point, a second location in the environment; and
performing a task based on the determined distance between the position of the user and the position of the object in the environment includes performing a task based on the first and second locations.

26. The non-transitory computer-readable storage medium of claim 15, wherein:
determining a convergence point of the first direction of gaze and the second direction of gaze includes:
determining a first convergence point relative to a first position of the user; and
determining a second convergence point relative to a second position of the user;
determining a distance between a position of the user and a position of an object in an environment based on the convergence point includes:
determining, based on the first convergence point, a first location in the environment; and
determining, based on the second convergence point, a second location in the environment; and
performing a task based on the determined distance between the position of the user and the position of the object in the environment includes performing a task based on the first and second locations.

27. The method of claim 20, wherein:
determining a convergence point of the first direction of gaze and the second direction of gaze includes:
determining a first convergence point relative to a first position of the user; and
determining a second convergence point relative to a second position of the user;
determining a distance between a position of the user and a position of an object in an environment based on the convergence point includes:
determining, based on the first convergence point, a first location in the environment; and
determining, based on the second convergence point, a second location in the environment; and
performing a task based on the determined distance between the position of the user and the position of the object in the environment includes performing a task based on the first and second locations.

* * * * *